United States Patent
Chen et al.

(10) Patent No.: US 11,593,011 B2
(45) Date of Patent: Feb. 28, 2023

(54) METHOD, DEVICE, AND PROGRAM PRODUCT FOR MANAGING SPARE BLOCK BASED ON DYNAMIC WINDOW

(71) Applicant: EMC IP Holding Company LLC, Hopkinton, MA (US)

(72) Inventors: Chi Chen, Chengdu (CN); Huijuan Fan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 20 days.

(21) Appl. No.: 17/477,877

(22) Filed: Sep. 17, 2021

(65) Prior Publication Data
US 2022/0308776 A1    Sep. 29, 2022

(30) Foreign Application Priority Data
Mar. 23, 2021    (CN) .......................... 202110309503.7

(51) Int. Cl.
*G06F 3/06* (2006.01)
(52) U.S. Cl.
CPC .......... *G06F 3/0644* (2013.01); *G06F 3/0619* (2013.01); *G06F 3/0647* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 7,216,195 B1 * | 5/2007 | Brown ................ | G06F 11/2094 710/316 |
| 7,386,666 B1 | 6/2008 | Beauchamp et al. | |
| 8,706,960 B1 | 4/2014 | Ives et al. | |
| 9,256,381 B1 | 2/2016 | Fultz et al. | |
| 9,864,753 B1 * | 1/2018 | Armangau ........... | G06F 3/0653 |
| 10,838,911 B1 * | 11/2020 | Franklin .............. | G06F 16/113 |
| 10,852,966 B1 | 12/2020 | Liu et al. | |
| 10,908,997 B1 * | 2/2021 | Vankamamidi ......... | G06F 3/061 |
| 2007/0067665 A1 * | 3/2007 | Hashemi ............... | G06F 3/0605 714/E11.034 |
| 2017/0315745 A1 * | 11/2017 | Agombar .............. | G06F 3/0653 |
| 2018/0067673 A1 * | 3/2018 | Agombar .............. | G06F 3/0631 |
| 2018/0081757 A1 * | 3/2018 | Chiba ................... | G06F 3/0689 |
| 2020/0026450 A1 * | 1/2020 | Han ...................... | G06F 3/0689 |

* cited by examiner

*Primary Examiner* — Kaushikkumar M Patel
(74) *Attorney, Agent, or Firm* — BainwoodHuang

(57) ABSTRACT

Techniques manage spare extents based on a dynamic window. In particular, in response to determining that the number of spare extents in a source storage device of a plurality of storage devices is lower than a predetermined threshold, a source extent is selected from the source storage device, and the source extent is an extent in a created stripe included in a storage system. Based on a set of extents other than the source extent in the stripe, a set of storage device sequences respectively associated with the set of extents are determined. A destination extent is identified from a plurality of spare extents in the set of storage device sequences. Data in the source extent is migrated to the destination extent. Accordingly, load balancing of the spare extents in each storage device of the storage system may be ensured.

20 Claims, 9 Drawing Sheets

METHOD, DEVICE, AND PROGRAM PRODUCT FOR MANAGING SPARE BLOCK BASED ON DYNAMIC WINDOW

CROSS-REFERENCE TO RELATED APPLICATION

This application claims priority to Chinese Patent Application No. CN202110309503.7, on file at the China National Intellectual Property Administration (CNIPA), having a filing date of Mar. 23, 2021, and having "METHOD, DEVICE, AND PROGRAM PRODUCT FOR MANAGING SPARE BLOCK BASED ON DYNAMIC WINDOW" as a title, the contents and teachings of which are herein incorporated by reference in their entirety.

TECHNICAL FIELD

Various implementations of the present disclosure relate to storage management, and more particularly, to a method, a device, and a computer program product for managing spare extents in a storage system based on a dynamic window.

BACKGROUND

With the development of data storage technologies, various data storage devices have been capable of providing users with higher and higher data storage capacities. While data storage capabilities are improved, users also have increasingly high demands for data reliability and extendibility of storage systems. At present, various data storage systems based on Redundant Array of Independent Disks (RAID) have been developed to improve data reliability. When one or more disks in a storage system fail, data in the failed disks may be reconstructed from data on other normally operating disks.

A Mapped RAID has been developed at present. In this Mapped RAID, disk is a logical concept and may include a plurality of extents. A plurality of extents included in a logical disk may be distributed on different physical storage devices in a storage system. For a plurality of extents in one stripe of the Mapped RAID, the plurality of extents should be distributed on different physical storage devices, so that when a physical storage device where one of the plurality of extents is located fails, a reconstruction operation may be performed to recover data from physical storage devices where other extents are located. A spare storage space (including one or more spare extents) may be reserved in each storage device for a recovery operation.

To facilitate the management of the plurality of storage devices in a storage system, a plurality of storage devices can be divided into at least one group in accordance with a grouping threshold (including an upper limit threshold and a lower limit threshold), as proposed currently. Stripes in a user storage system may be created based on the storage devices in each group. Since the spare storage space in the storage devices can only be shared within a group, when the recovery operation is required, the spare storage space in a certain group may be insufficient and the spare storage space in another group may be barely used. At this moment, how to use the storage space in the storage devices as efficiently as possible has become a technical problem.

SUMMARY OF THE INVENTION

Therefore, it is desirable to develop and implement a technical solution for managing spare extents in a storage system in a more effective manner. It is desirable that the technical solution is compatible with existing storage systems, and by modifying various configurations of existing storage systems, storage devices may be managed in a more effective manner.

According to a first aspect of the present disclosure, a method for managing spare extents in a storage system is provided. The storage system includes a plurality of storage devices. In this method, in response to determining that the number of spare extents in a source storage device of the plurality of storage devices is lower than a predetermined threshold, a source extent is selected from the source storage device, and the source extent is an extent in a created stripe included in the storage system. Based on a set of extents other than the source extent in the stripe, a set of storage device sequences respectively associated with the set of extents is determined, wherein a storage device sequence in the set of storage device sequences is associated with an extent in the set of extents, and includes a storage device where the extent is located and a plurality of consecutive storage devices adjacent to the storage device. A destination extent is identified from a plurality of spare extents in the set of storage device sequences. Data in the source extent is migrated to the destination extent.

According to a second aspect of the present disclosure, an electronic device is provided. The electronic device includes: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided. The computer program product is tangibly stored on a non-transitory computer-readable medium and includes machine-executable instructions which are used for executing the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or identical objects. Other explicit and implicit definitions may also be included below.

Figure 1A:
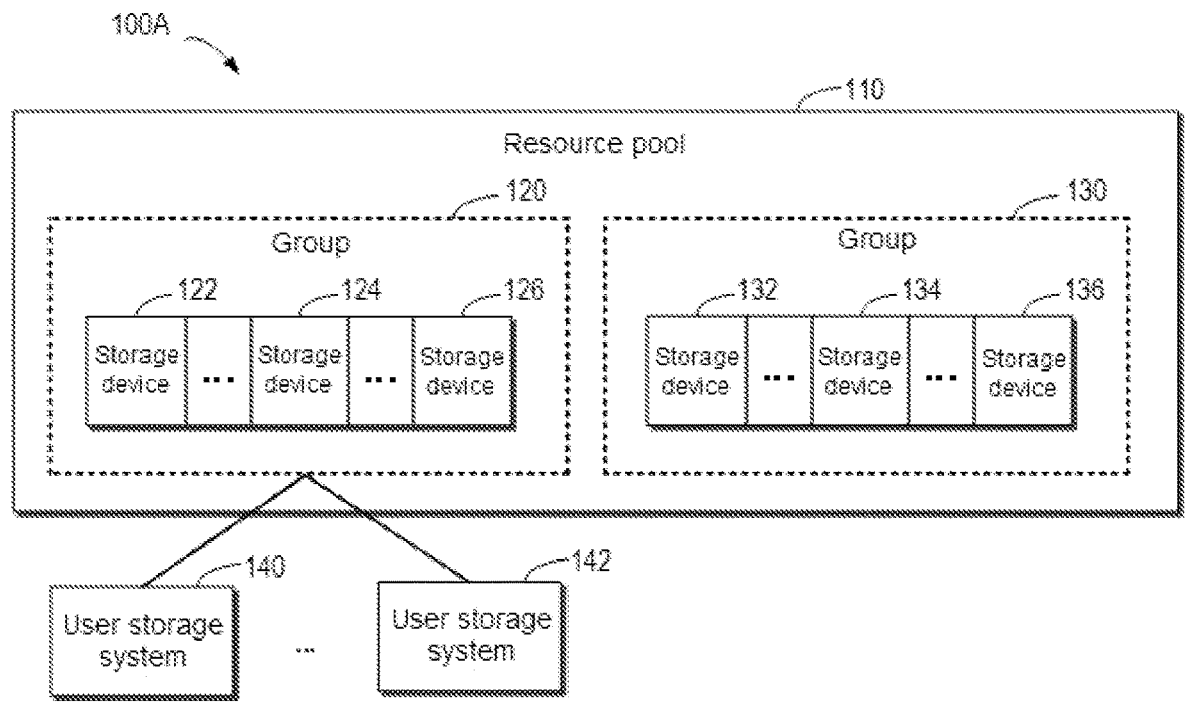
FIG. 1A schematically illustrates a schematic diagram of a storage system according to a technical solution.
Figure 1B:
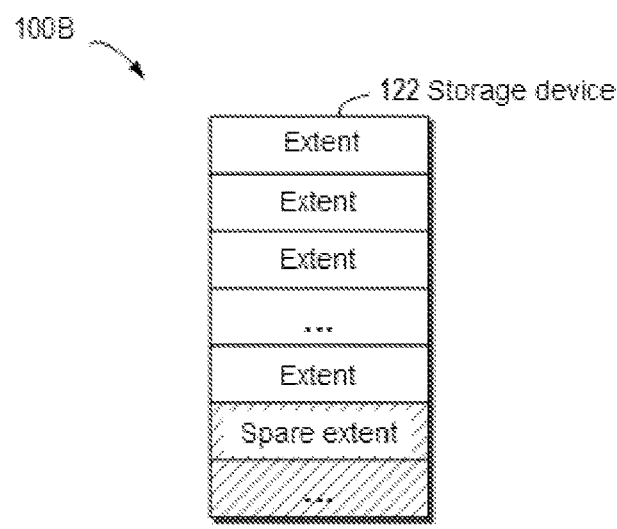
FIG. 1B schematically illustrates a schematic diagram of a storage device in the storage system as shown in FIG. 1A.

First, referring to FIG. 1A and FIG. 1B, an application environment of a storage system is described. FIG. 1A schematically illustrates schematic diagram 100A of a storage system according to a technical solution. As shown in FIG. 1A, the storage system may include resource pool 110 which may include a plurality of storage devices. To facilitate management, the plurality of storage devices may be divided into one or more groups. For example, storage devices 122, . . . , 124, . . . , and 126 may be grouped into group 120, and storage devices 132, . . . , 134, . . . , and 136 may be grouped into group 130.

The storage system may be a RAID-based storage system. The RAID-based storage system may combine a plurality of storage devices into one disk array. By providing redundant storage devices, the reliability of the entire disk group may greatly exceed that of a single storage device. RAID may provide various advantages over a single storage device, such as enhanced data integration, enhanced fault tolerance, increased throughput or capacity, and so on. There are multiple standards for RAID, such as RAID-1, RAID-2, RAID-3, RAID-4, RAID-5, RAID-6, RAID-10, RAID-50, and so on.

Based on a Mapped RAID technology, storage space in the storage devices in one group may be used to create a user storage system. For example, user storage systems 140, . . . , and 142 may be created based on the storage devices in group 120, respectively. In such case, for one stripe in the user storage system, idle extents can only be selected from the storage devices in one group to create the stripe. In other words, a plurality of extents in the stripe can only come from one group and cannot span multiple groups.

It will be understood that the number of storage devices included in the group has a threshold range (for example, including an upper limit threshold and a lower limit threshold). In general, the upper limit threshold may be set to 64 or some other values, and the lower limit threshold may be determined based on a stripe width of the storage system and the number of backup storage devices required. For example, in a 4D+1P storage system with the stripe width of 4+1=5 and the number of backup storage devices of 1, the lower limit threshold can be determined based on the sum of the two: 5+1=6. In this case, each group may include from 6 to 64 storage devices. When the number of storage devices included in resource pool 110 exceeds 64, multiple groups may exist.

A spare storage space may be reserved in each storage device. Specifically, FIG. 1B schematically illustrates schematic diagram 100B of storage device 122 in the storage system shown in FIG. 1A. As shown in FIG. 1B, storage device 122 may include a plurality of extents, in which the extents shown in blanks represent ordinary extents that may be used to create a stripe in a user storage system, and the extents shown in hatches represent spare extents reserved in the storage device and used to restore data. The size of the spare storage space in one group may be designated in advance. For example, the total amount of spare storage space may be specified based on the size of the storage space of a storage device. At this moment, one storage device may include one or more spare extents.

It will be understood that the spare storage space can only be shared among the storage devices in the group. In other words, when a storage device in a group fails, only the spare storage space in the storage device in the group can be used, and the spare storage space in another group cannot be used across the group. The probabilities of failure of the storage devices in the groups are different, which will lead to a situation where the spare storage space in a certain group is about to be exhausted, while the spare storage space in another group has not yet been used. In a group-based technical solution, on the one hand, reserving a sufficient spare storage space in each group may cause a waste of the storage space, and on the other hand, workloads of the spare storage space in different groups may be significantly unbalanced.

Figure 2:
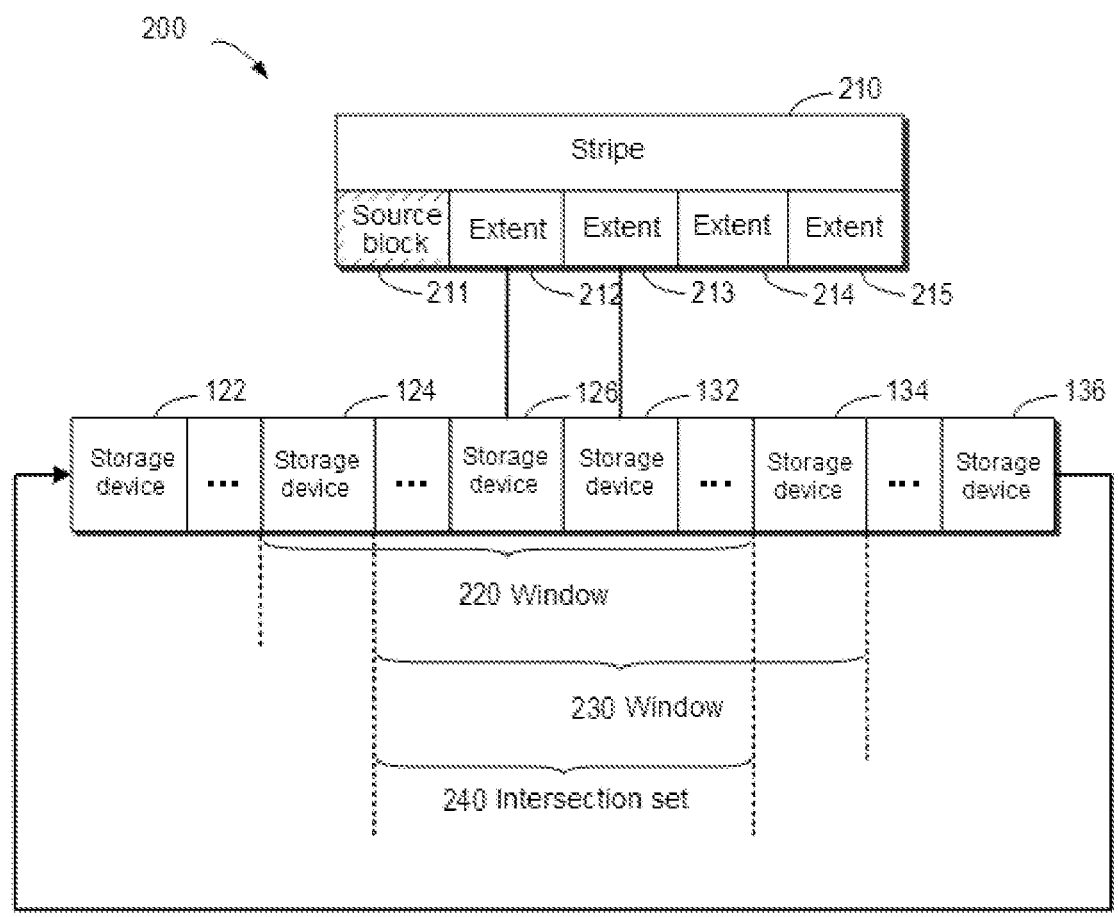
FIG. 2 schematically illustrates a block diagram of a process for managing spare extents based on a dynamic window according to an implementation of the present disclosure.

In order to at least partially solve the problems in the above technical solution, a technical solution for managing a spare storage space in a storage system based on a dynamic window is provided according to an example implementation of the present disclosure. Hereinafter, a process according to an example implementation of the present disclosure will be described in general with reference to FIG. 2. FIG. 2 schematically illustrates a block diagram of process 200 for managing spare extents based on a dynamic window according to an implementation of the present disclosure. According to an example implementation of the present disclosure, groups in the existing technical solutions are discarded, and unified management of spare extents in all storage devices in a storage system is proposed.

Hereinafter, only the 4D+1P storage system will be described as an example. When it is found that the number of spare extents in a certain storage device in the storage system (for example, the storage device where extent 211 in stripe 210 is located) is small, a target storage device may be determined from a plurality of storage devices based on locations of other extents in stripe 210, so that data in extent 211 may be migrated to an unused spare extent in the target storage device. Then, extent 211 may be labeled as an unused spare extent. In this way, the spare extents in the storage devices may be shared within the whole storage system, thereby increasing a utilization rate of the storage space in the storage devices and ensuring load balancing of the spare extents in the storage devices.

Specifically, other extents 212, 213, 214, and 215 included in stripe 210 where extent 211 is located may be determined first. Further, a storage device sequence associated with each of the other extents may be determined respectively. Taking only extents 212 and 213 as examples, it can be determined that extent 212 is located in storage device 126 and extent 213 is located in storage device 132, respectively. In this case, the storage device sequence associated with extent 212 includes storage devices 124, . . . , 126, 132, . . . in window 220, and the storage device sequence associated with extent 213 includes storage devices 126, 132, . . . , and 134 in window 230. In such case, an overlapping part of windows 220 and 230 is shown as intersection set 240. Further, a destination extent may be identified based on a plurality of spare extents in storage device sequences (for example, based on the intersection set of various windows) respectively associated with extents 212, 213, 214, and 215.

With the example implementation of the present disclosure, the concept of "group" in the existing technical solutions is discarded. When spare extents in a source storage device are insufficient, a destination storage device that can be used for migration can be dynamically determined based on locations of other extents in the stripe where the source extent in the source storage device is located. In this way, for different source extents, the destination storage device may be selected from different storage devices to perform data migration. As a result, the spare extents in the storage devices including more spare extents can be used more fully, thereby avoiding a shortage of the spare extents in some storage devices.

Figure 3:
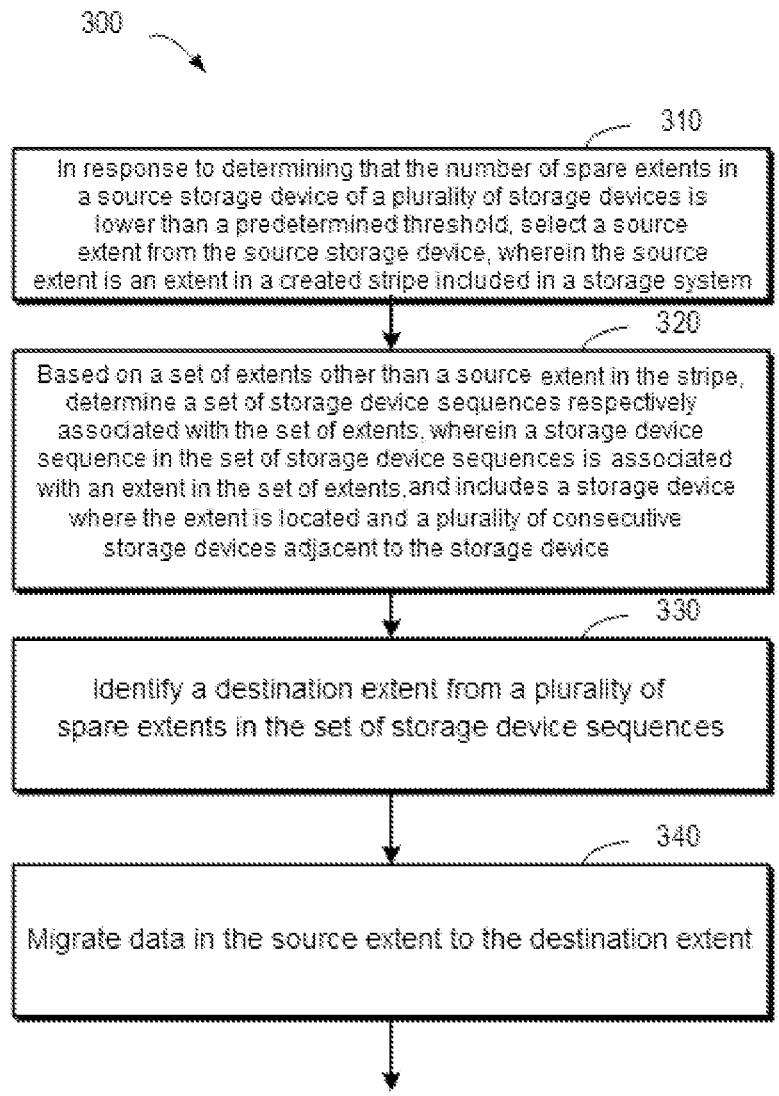
FIG. 3 schematically illustrates a flow chart of a method for managing spare extents based on a dynamic window according to an implementation of the present disclosure.

According to an example implementation of the present disclosure, more details of an example implementation according to the present disclosure will be described with reference to FIG. 3. FIG. 3 schematically illustrates a flow chart of method 300 for managing spare extents based on a dynamic window according to an implementation of the present disclosure. At block 310, in response to determining that the number of spare extents in a source storage device of a plurality of storage devices is lower than a predetermined threshold, a source extent is selected from the source storage device, and the source extent is an extent in a created stripe included in a storage system. According to an example implementation of the present disclosure, it can be determined whether the number of spare extents in each storage device is lower than the predetermined threshold, and the technical solution for managing the spare extents can be activated when the number is lower than the predetermined threshold.

According to an example implementation of the present disclosure, a source extent may be randomly selected from a source storage device. Alternatively and/or additionally, the source extent may be selected based on workloads of the extents in the stripes that has been created in the source storage device. For example, an extent with a low workload may be selected preferably. In such case, when the source extent is migrated to a destination storage device that includes abundant spare extents, it will not cause too much burden on the destination storage device.

It will be understood that the stripe here is a stripe, which has been allocated to a user storage system, in the storage system. It will be understood that the stripe here is a stripe created based on a dynamic window. Specifically, each extent in the stripe can be respectively selected in multiple rounds. In the first round, extent 211 may be selected from a storage device as a first extent in stripe 210. A storage device sequence associated with extent 211 may be determined based on a predetermined window size. Further, extent 212 may be selected from one storage device in the storage device sequence as a second extent in stripe 210. Here, stripe 210 includes two extents 211 and 212. Further, other extents in stripe 210 may be selected based on an intersection set of the storage device sequences associated with various extents in stripe 210. It will be understood that the storage device sequence associated with the extent here includes the storage device where the extent is located and a plurality of consecutive storage devices adjacent to the storage device. Hereinafter, more details about the window and the storage device sequence will be described.

According to an example implementation of the present disclosure, groups in the existing storage system are discarded when a stripe is created, so that spare extents in all storage devices in the storage system may be uniformly managed in a more flexible manner. The load balancing of the spare extents in each storage device may be ensured. Further, since the location of the window can be changed with the location of a storage device lacking spare extents, a target storage device for data migration can be selected from more storage devices in a more flexible manner. In this way, unbalancing of workloads of the spare storage space in various storage devices in the storage system can be avoided, and the spare storage space in storage devices can be used more fully.

Referring back to FIG. 3, at block 320, based on a set of extents (for example, including extents 212, 213, 214, and 215) other than source extent 211 in stripe 210, a set of storage device sequences respectively associated with the set of extents are determined. Herein, a storage device sequence in the set of storage device sequences is associated with an extent in the set of extents, and includes a storage device where the extent is located and a plurality of consecutive storage devices adjacent to the storage device. According to an example implementation of the present disclosure, an associated storage device sequence may be determined for each extent in a set of extents. It will be understood that in processes of creating a stripe and managing spare extents, methods of determining the storage device sequence associated with the extent are the same. In the following, extent 212 in a set of extents will be used as an example only, to describe how to determine a storage device sequence associated with extent 212. Firstly, a storage device where extent 212 is located may be determined from a plurality of storage devices, and a plurality of consecutive storage devices adjacent to the storage device may be determined based on a predetermined window size.

Figure 4:
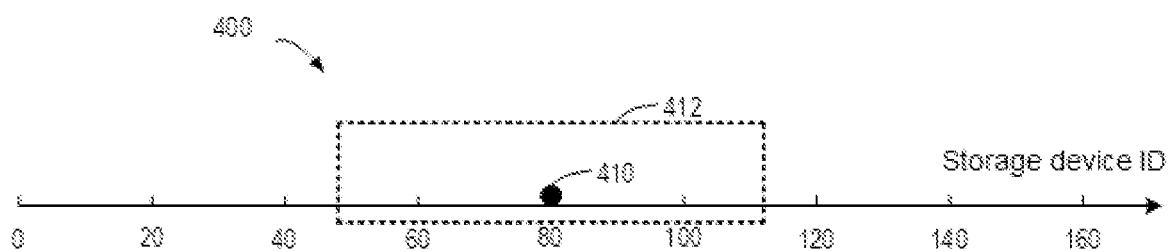
FIG. 4 schematically illustrates a block diagram of a dynamic window according to an implementation of the present disclosure.
Figure 5:
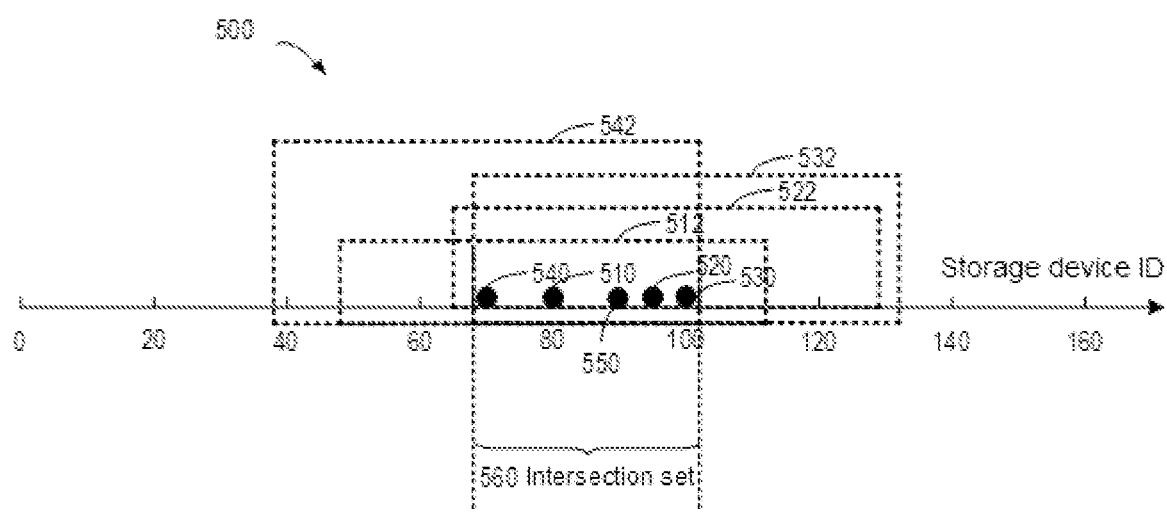
FIG. 5 schematically illustrates a block diagram of storage device sequences respectively associated with each extent in a stripe according to an implementation of the present disclosure.

Hereinafter, more information about the dynamic window will be described with reference to FIG. 4. FIG. 4 schematically illustrates a block diagram of dynamic window 400 according to an implementation of the present disclosure. Assuming that a storage system includes 160 storage devices (i.e., storage devices D0 to D159), various storage devices arranged in order are shown on a coordinate axis, where coordinate points show IDs of the storage devices. As shown in FIG. 5, a black dot indicates storage device 410 (D80) where extent 212 in the stripe is located. According to an example implementation of the present disclosure, a storage device sequence (as shown in window 412) associated with extent 212 may be determined based on the location of storage device 410, and the storage device sequence herein includes storage device 410 and a set of consecutive storage devices, adjacent to storage device 410, among a plurality of storage devices. A width of window 412 can be specified in advance. For example, the width of the window can be set based on the upper limit threshold and/or other values of groups in the existing technical solutions. According to an example implementation of the present disclosure, a window width of 64 (or other values) may be specified.

According to an example implementation of the present disclosure, a storage device sequence may be determined based on a predetermined window size, so that storage device 410 is close to the center of the storage device sequence, that is, storage device 410 may be close to the center of window 412. For example, 32 storage devices may be selected from the left side of storage device 410, and 31 storage devices may be selected from the right side of storage device 410. In the example of FIG. 4, the storage device sequence may include the following storage devices: D48 to D111. For another example, 31 storage devices may be selected from the left side of storage device 410, and 32 storage devices may be selected from the right side of storage device 410. It will be understood that the above schematically shows determining the storage device sequence from both sides of storage device 410 in a substantially symmetrical manner. According to an example implementation of the present disclosure, a sliding range of window 412 may be specified. For example, 30 storage devices may be selected from the left side of a storage device, and 33 storage devices may be selected from the right side of the storage device. For another example, 29 storage devices may be selected from the left side of a storage device, and 34 storage devices may be selected from the right side of the storage device.

It will be understood that the sliding range of the window used to manage spare extents here is consistent with the sliding range of a window used for creating a stripe. In the process of creating the stripe, it is required to ensure that an intersection set of the sliding windows includes a sufficient number of storage devices for creating the stripe. In a 4D+1P stripe, 5 extents are included. In such case, it is required to select storage devices used to generate other extents in the stripe based on the intersection set of the storage device sequences associated with each extent in the stripe. Therefore, it should be ensured that in extreme cases (storage devices located at the edge of the intersection set are selected every time), the intersection set at least includes one storage device when the last storage device is selected. Therefore, the sliding range of the window should be greater than or equal to 5−1=4. That is, in the process of determining the storage device sequence associated with the extent in the stripe, a distance between an edge of the window and the storage device where the extent in the stripe is located should be greater than or equal to 4.

According to an example implementation of the present disclosure, for a stripe with a width of M, when determining a storage device sequence associated with each selected storage device, it should be ensured that a distance between an edge of the window and the selected storage device is greater than or equal to M−1. It will be understood that the edge of the window here includes left and right edges of the window. That is, in extreme cases, the storage device sequence may include: M−1 storage devices on the left side (or right side) of the selected storage device, and 64−(M−1)−1 storage devices on the right side (or left side) of the selected storage device. By means of the example implementation of the present disclosure, it can be ensured that the intersection set of various storage device sequences at least includes one storage device in the process of determining the last extent in the stripe.

According to an example implementation of the present disclosure, in order to ensure that storage device sequences may be determined in a consecutive manner, the plurality of storage devices may be arranged in a ring manner. It will be understood that if the number of the plurality of storage devices in the storage system is less than an upper limit threshold (for example, 64), no matter how the window slides here, the plurality of storage devices will lie in the same group threshold range. If the number of the plurality of storage devices is greater than the upper limit threshold, the sliding of the window will allow more storage devices to be used to create a stripe and/or as target storage devices, thereby improving utilization efficiency and balance degree of the storage system.

The foregoing has described how to determine the storage device sequence associated with extent 212 in stripe 210. Storage device sequences respectively associated with extents 213, 214, and 215 may be determined in a similar manner. Hereinafter, how to determine the destination extent will be described by returning to FIG. 3. At block 330 in FIG. 3, a destination extent is identified from a plurality of spare extents in a set of storage device sequences. Here, the set of storage device sequences includes 4 storage device sequences, that is, the storage device sequences respectively associated with extents 212, 213, 214, and 215.

FIG. 5 schematically illustrates block diagram 500 of each storage device sequence associated with each extent in stripe 210 according to an implementation of the present disclosure. Assume that extent 211 in stripe 210 is located in source storage device 550 (D90) and there is a shortage of spare extents in the storage device. Other four extents 212, 213, 214, and 215 in stripe 210 are respectively located in storage devices 510 (D80), 520 (D96), 530 (D100), and 540 (D70). The storage device sequences respectively associated with storage devices 510 to 540 may be respectively determined based on the method described above.

Specifically, it can be determined that storage device sequence 512 associated with storage device 510 includes: D48 to D111 (32 storage devices are selected from the left side of storage device 510, and 31 storage devices are selected from the right side of storage device 510); storage device sequence 522 associated with storage device 520 includes: D64 to D127; storage device sequence 532 associated with storage device 530 includes: D68 to D131; and storage device sequence 542 associated with storage device 540 includes: D38 to D101. Here, the destination storage device may be selected from intersection set 560 (D68 to D101) of the foregoing storage device sequences. Thus, compared to the selection of the destination storage device within the group in the prior art solution, the location of the destination storage device selected by the process of FIG. 5 is no longer limited to within a group, but can change along with the location of each extent in the stripe. In this way, load balancing of the spare extents in each storage device of the storage system may be ensured.

It will be understood that the RAID technology requires that each extent in a stripe is located in a different storage device, and accordingly, a set of candidate storage devices that do not include any extents in the stripe may be determined first from at least one storage device in the intersection set, and a destination storage device may be selected from the set of candidate storage devices. According to an example implementation of the present disclosure, the concept of stripe correlation is proposed, here the stripe correlation represents a degree of association between a specific candidate storage device and stripe 210. The lower the stripe correlation is, the lower the possibility that the specific candidate storage device and the device where an extent in stripe 210 is located are accessed simultaneously is. Therefore, a candidate storage device with a low stripe correlation may be preferably selected as a destination storage device. In this way, access efficiency of data in stripe 210 may be improved.

According to an example implementation of the present disclosure, a stripe correlation of a specific storage device and a specific stripe may be determined based on a correlation between two storage devices. In the following, the concept of correlation between two storage devices is first introduced. The 4D+1P RAID stripe includes 5 extents, and data in the 5 extents are usually accessed in association. This results in an increase in the access volume of five storage devices respectively including the five extents. In general, for any two storage devices, the more stripes the two storage devices serve jointly, the greater the possibility that the two storage devices are accessed simultaneously and the higher the workloads of the two storage devices will be. Therefore, two storage devices should be prevented from serving too many stripes at the same time.

For an ith storage device and a jth storage device in a plurality of storage devices (i≠j), the correlation between the two storage devices may be expressed as $\gamma_{Disk\ i, Disk\ j}$. According to an example implementation of the present disclosure, the correlation of a storage device with respect to itself can be set to 0, that is, $\gamma_{Disk\ i, Disk\ i}=0$. As the storage system is used over time, some stripes will be created in the storage system. Hereinafter, how to determine the correlation between the storage devices will be described with reference to FIG. 6.

Figure 6:
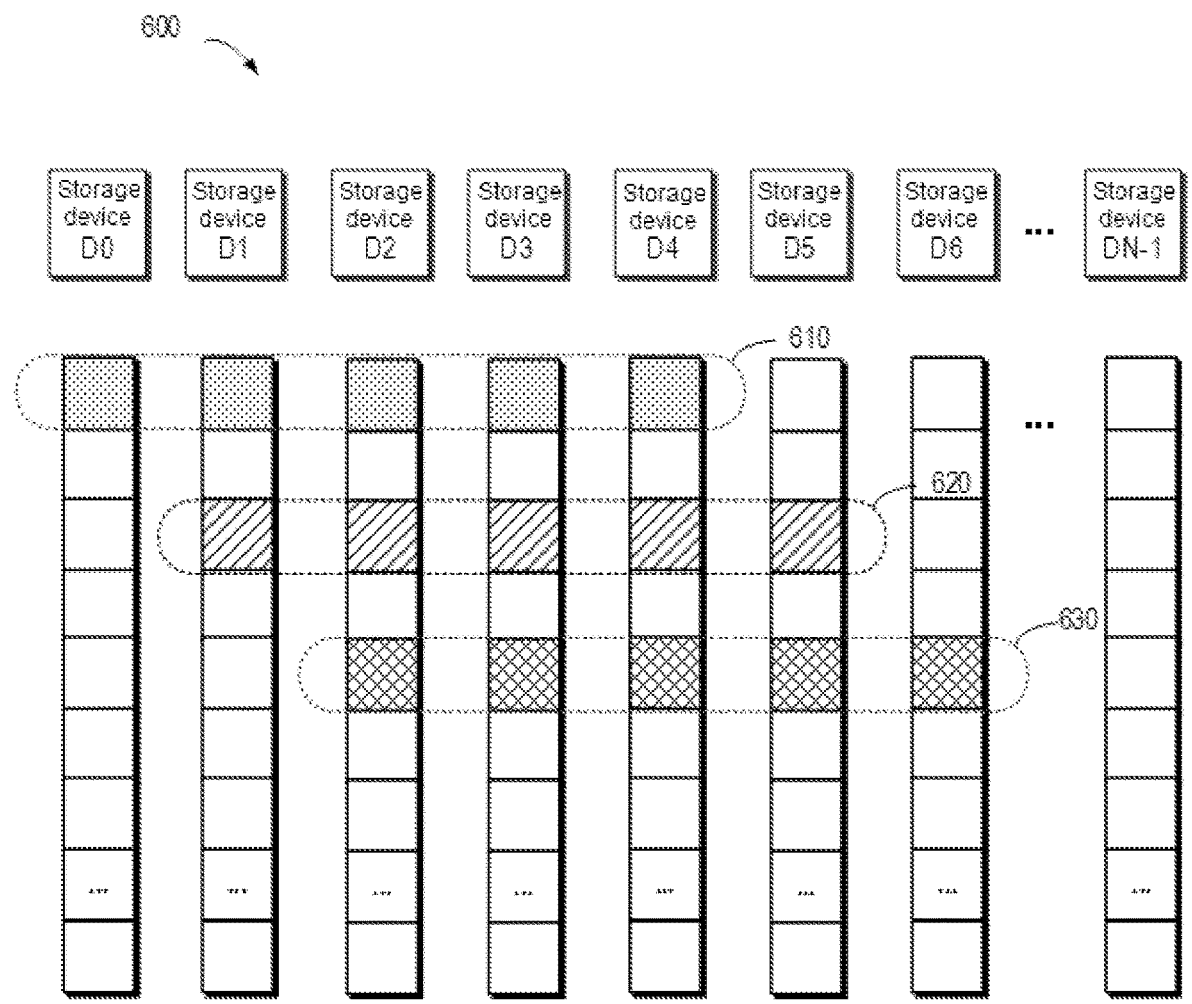
FIG. 6 schematically illustrates a block diagram of a process for determining a correlation between two storage devices according to an implementation of the present disclosure.

FIG. 6 schematically illustrates a block diagram of process 600 for determining a correlation between two storage devices according to an implementation of the present disclosure. As shown in FIG. 6, it is assumed that the storage system includes N (N is a positive integer) storage devices D0 to DN−1. Three stripes 610, 620, and 630 have been created in the storage system, and the correlation $\gamma_{Disk\ i, Disk\ j}$ may be determined based on the number of stripes that jointly involve the ith storage device and the jth storage device. If it is expected to determine a correlation between storage device D0 and storage device D1 (i.e., i=0, j=1), it may be found that only stripe 610 uses extents in storage device D0 and storage device D1 at the same time, and thus $\gamma_{Disk\ 0, Disk\ 1}=1$.

For another example, if it is expected to determine a correlation between storage device D1 and storage device D2 (i.e., i=1, j=2), it may be found that stripe 610 uses extents in storage device D1 and storage device D2 at the same time, stripe 620 also uses the extents in storage device D1 and storage device D2 at the same time, and thus $\gamma_{Disk\ 1, Disk\ 2}=2$. Similarly, a correlation between any two storage devices in the plurality of storage devices may be determined. A mapping relationship between stripes and extents in the stripes may be conveniently obtained from address mapping of the storage system. Thus, with the example implementation of the present disclosure, a correlation $\gamma_{Disk\ 1, Disk\ 2}$ between any two storage devices may be determined in a simple and effective manner.

According to an example implementation of the present disclosure, a device correlation of a specific storage device in the plurality of storage devices may be determined based on a correlation between two storage devices. Specifically, a correlation between the specific storage device and each of the storage devices other than the specific storage device may be determined respectively. Furthermore, the device correlation of the specific storage device may be determined based on the determined correlations.

According to an example implementation of the present disclosure, the device correlation may be set to be positively proportional to the correlation between the storage device and each of the other storage devices. For example, a sum of multiple correlations may be acquired, and the device correlation may be determined based on the summation operation. With the example implementation of the present disclosure, the device correlation of the specific storage device may be determined based on the correlations between the specific storage device and other storage devices on the basis of simple mathematical operations. Assuming that it is expected to determine a device correlation of the ith storage device, a correlation between the ith storage device and another jth storage device (0≤j≤N−1, and i≠j) may be determined based on the method described above with reference to FIG. 6. According to an example implementation of the present disclosure, the device correlation $\gamma_{Disk\ i}$ of the ith storage device may be determined based on the following formula 1:

$$\gamma_{Disk\ i} = \sum_{j=0}^{N-1} \gamma_{Disk\ i, Disk\ j} \qquad \text{Formula 1}$$

where $\gamma_{Disk\ i}$, represents the device correlation of the ith storage device, $\gamma_{Disk\ i, Disk\ j}$ represents the correlation between the ith storage device and the jth storage device, and N represents the number of storage devices in the resource pool.

With the example implementation of the present disclosure, for the ith storage device, a device correlation $\gamma_{Disk\ i}$ of the device indicates a sum of correlations between the ith storage device and the other N−1 storage devices. In this case, the device correlation may accurately measure a degree of correlation between the ith storage device and the other storage devices, and may reflect a workload of the storage device. Selecting a storage device for creating a stripe based on the device correlation can accurately select a suitable storage device that helps achieve load balance based on the workloads of the storage devices.

It will be understood that formula 1 above only schematically shows a specific example for determining a device correlation. According to an example implementation of the present disclosure, other formulas may also be used to determine the device correlation. For example, the device correlation may be determined based on a product of multiple correlations. According to an example implementation of the present disclosure, a stripe correlation may be determined based on the device correlation. Herein, the stripe correlation describes a correlation between one storage device and a plurality of storage devices where one stripe is located. A higher stripe correlation indicates a closer relationship between the storage device and the stripe. For example, a stripe correlation $\gamma_{Disk\ i,RE\ k}$ between the ith storage device and the kth stripe may be determined based on the following formula 2.

$$\gamma_{Disk\ i,RE\ k} = \sum_{Disk\ j \in RE\ k} \gamma_{Disk\ i, Disk\ j} \qquad \text{Formula 2}$$

where $\gamma_{Disk\ i,RE\ k}$ represents the stripe correlation between the ith storage device and the kth stripe, $\gamma_{Disk\ i, Disk\ j}$ represents the correlation between the ith storage device and the jth storage device, and the jth storage device represents various storage devices including extents in the kth stripe. With the example implementation of the present disclosure, the correlations between a storage device and storage devices where all the extents in the stripe are located can reflect degrees of closeness between the storage device and various storage devices involved in the stripe. A degree of closeness between a device and a stripe can be determined in a simple and effective way by summing multiple correlations.

According to an example implementation of the present disclosure, a set of stripe correlations between a set of candidate storage devices and a stripe may be determined, respectively. Further, a destination storage device in the set of candidate storage devices may be selected based on the set of stripe correlations. According to an example implementation of the present disclosure, the stripe correlations of the various candidate storage devices may be compared, and a candidate storage device with a minimum stripe correlation may be selected as a destination storage device. In this way, storage devices that are not closely related with the various storage devices involved by the current stripe may be utilized as much as possible, which allows the stripe to run with high performance.

For convenience of description, a symbol $\gamma_{Disk\ i,RE\ current}$ may be used to represent the stripe correlation between the ith storage device and the current stripe, where RE current indicates a storage device where an extent in the current stripe is located. With the example implementation of the present disclosure, the stripe correlations of various storage devices may be determined one by one only through simple mathematical calculations. In this way, it can be ensured each time that a storage device that most contributes to load balancing is selected from the plurality of storage devices as the destination storage device.

Selecting the destination storage device based on the stripe correlation has been described above. According to an example implementation of the present disclosure, the destination storage device may also be selected based on the stripe correlation and the device correlation of the storage device. It will be understood that a plurality of extents in the stripe will be associatively accessed, and the selection of the storage device based on the stripe correlation may take mutual influences between various storage devices in the created stripe into account. Further, the performance of the storage device will also be affected by the correlations (that is, the device correlation) between the storage device and other storage devices. Therefore, the storage device can be selected based on both the stripe correlation and the device correlation. With the example implementation of the present disclosure, the factors in the above two aspects can be fully considered to improve the overall performance of the storage system.

According to an example implementation of the present disclosure, a combined correlation $\gamma'_{Disk\ i,RE\ k}$ between the ith storage device and the current stripe may be determined based on formula 3.

$$\gamma'_{Disk\ i,RE\ current} = \gamma_{Disk\ i,RE\ current} + \gamma_{Disk\ i} \qquad \text{Formula 3}$$

where $\gamma'_{Disk\ i,RE\ current}$ denotes the combined correlation between the ith storage device and the current stripe, $\gamma_{Disk\ i,RE\ current}$ denotes the stripe correlation between the ith storage device and the current stripe, and $\gamma_{Disk\ i}$ denotes the device correlation of the ith storage device. It will be understood that formula 3 is merely a specific example for calculating a combined correlation, and other formulas may be used to determine the combined correlation according to an example implementation of the present disclosure. For example, the combined correlation may be determined based on a product of a stripe correlation and a device correlation.

The foregoing has described how to determine the stripe correlation between each storage device in the intersection set and the current stripe based on formula 2 and formula 3. According to an example implementation of the present disclosure, the stripe correlation of each candidate storage device may be determined based on formula 2 or formula 3, and thus a storage device with a low (minimum) stripe correlation may be selected as a destination storage device.

According to an example implementation of the present disclosure, the destination storage device may be selected based on the number of unused spare extents in the destination storage device. For example, a candidate storage device with more unused spare extents may be preferably selected as the destination storage device. With the example implementation of the present disclosure, it is possible to use, as much as possible, a storage device that includes abundant spare extents as a migration destination. In this way, the shortage of extents in the destination storage device may be avoided. Further, a destination extent may be selected from the unused spare extents in the destination storage device. For example, an unused spare extent may be randomly selected.

Figure 7:
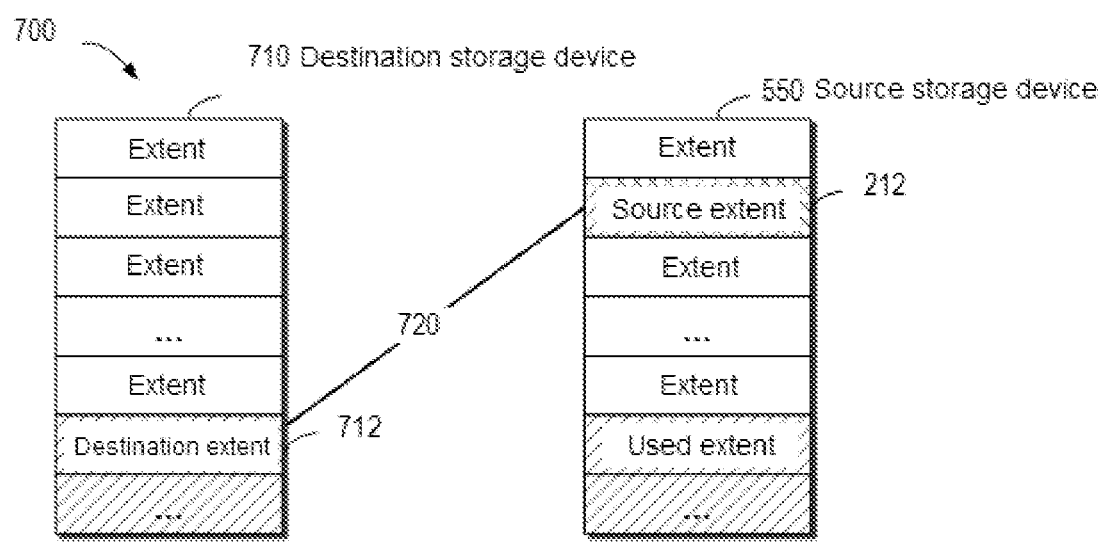
FIG. 7 schematically illustrates a block diagram of a process of migrating data to a destination extent from a source extent according to an implementation of the present disclosure.

At block 340, data in a source extent is migrated to the destination extent. Hereinafter, more details about data migration will be described with reference to FIG. 7. FIG. 7 schematically illustrates a block diagram of process 700 of migrating data to a destination extent from a source extent according to an implementation of the present disclosure. Assume that extent 212 is located in source storage device 550, and destination storage device 710 has been determined based on an intersection set of a plurality of storage device sequences. In this case, the data in source extent 212 may be migrated to destination extent 712.

It will be understood that here the data in source extent 212 has been copied to destination extent 712, and thus address mapping of stripe 210 may be updated based on an address of destination extent 712. The updated address mapping may indicate that stripe 210 includes destination extent 712 and extents 212, 213, 214, and 215. Further, source extent 212 may therefore be identified as a spare extent. Here, the number of spare extents in source storage device 550 will increase by one. It will be understood that the above only schematically illustrates the operation of migrating source extent 211 in source storage device 550 to destination extent 712 in destination storage device 710. According to an example implementation of the present disclosure, a similar operation may be performed for each storage device in the storage system. Hereinafter, more details about managing more spare extents in the storage system will be described with reference to FIG. 8.

Figure 8:
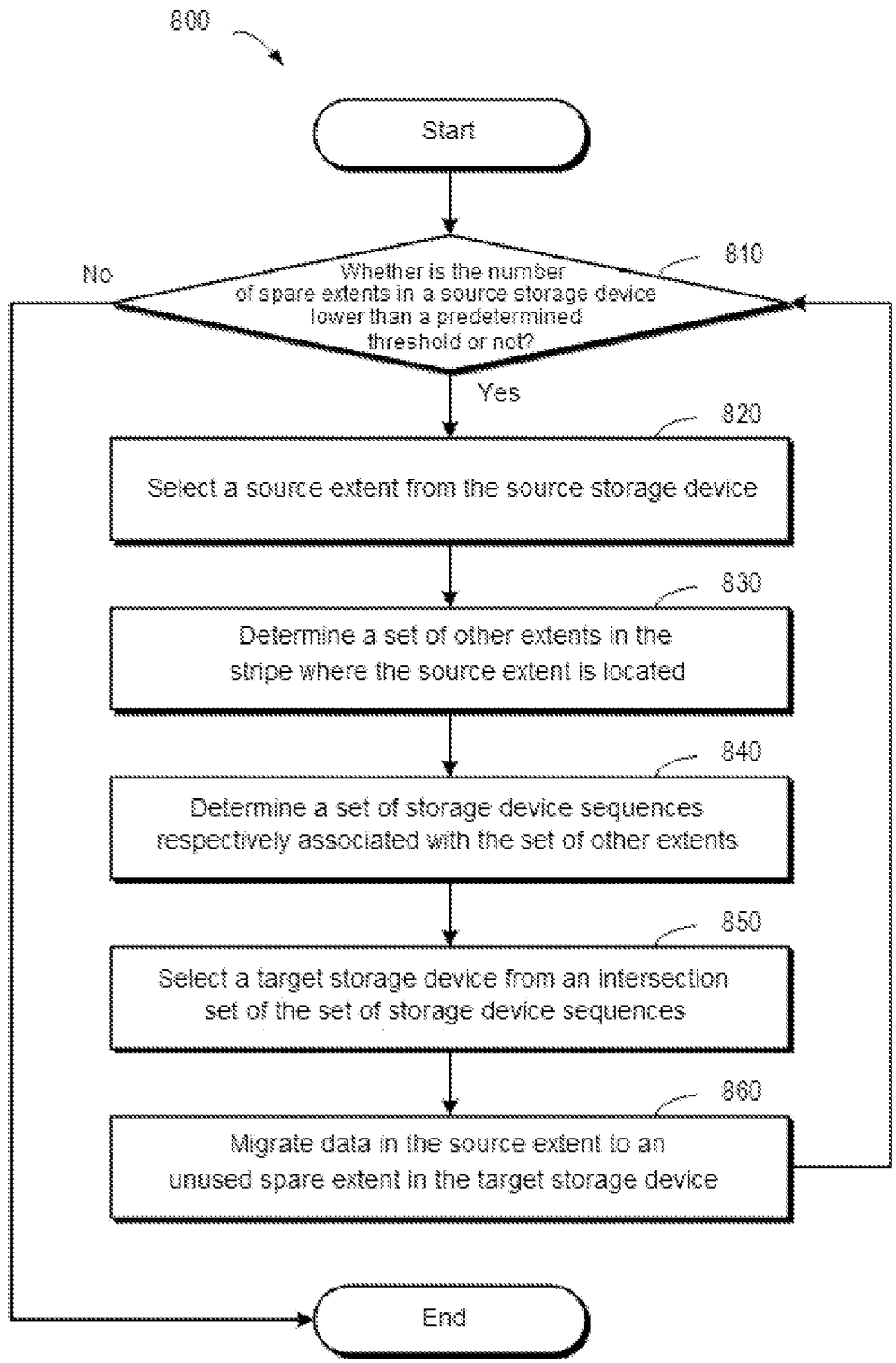
FIG. 8 schematically illustrates a flow chart of a method for managing spare extents based on a dynamic window according to an implementation of the present disclosure.

FIG. 8 schematically illustrates a flow chart of method 800 for managing spare extents based on a dynamic window according to an implementation of the present disclosure. Various storage devices in the storage system may be processed one by one. For example, the number of spare extents in each storage device may be determined one by one. For a certain source storage device, at block 810, if it is determined that the number of spare extents in a source storage device is lower than a predetermined threshold, method 800 proceeds to block 820. At block 820, a source extent may be selected from the source storage device. For example, the source extent may be selected randomly; for another example, a source extent with a low workload may be selected based on workloads of various extents in the source storage device. At block 830, a set of other extents in a stripe where the source extent is located may be determined. Here, the set of other extents refers to one or more extents other than the source extent in the stripe.

At block 840, a set of storage device sequences respectively associated with the set of other extents may be determined. Specifically, the storage device associated with each other extent may be determined based on the method described above. At block 850, a target storage device may be selected from an intersection set of the set of storage device sequences. For example, a set of candidate storage devices, which are different from the storage device where any extent in the stripe is located, are selected from the intersection set. A storage device with a large spare storage space may be selected from the set of candidate storage devices based on formula 2 or formula 3 described above, to serve as the target storage device. Further, at block 860, data in the source extent may be migrated to an unused spare extent in the destination storage device.

It will be understood that a process of migrating one source extent is only schematically shown at blocks 810 to 860. Other extents in the source storage device may be in a similar way. For example, method 800 may return to block 810 to determine whether the number of spare extents in the source storage device reaches a predetermined threshold. If the number is lower than the predetermined threshold, various steps at blocks 820 to 860 may be performed again. If the number is not lower than the predetermined threshold, method 800 is finished. In this case, a processing for one storage device in the storage system has been completed, and the other storage device in the storage system may be processed in a similar way. No more elaboration will be made in the following.

With the example implementation of the present disclosure, as the storage system runs, workloads of the spare extents in each storage device will remain evenly distributed in the whole storage system. In this way, the destination storage device may be selected among various storage devices inside the whole storage system and used for migration. Thus, a limitation in group-based management of spare extents can be abandoned, and load unbalancing of the spare extents in each storage device can be avoided. Further, since the spare extents can be shared within the whole storage system, there is no need to reserve a large amount of spare storage space for each group. In this way, the utilization rate of storage space in the storage system can be increased.

Examples of the method according to the present disclosure have been described in detail above with reference to FIG. 2 to FIG. 8, and implementations of a corresponding apparatus will be described below. According to an example implementation of the present disclosure, an apparatus for managing spare extents in a storage system is provided. The storage system includes a plurality of storage devices. The apparatus includes: a selection module configured to, in response to determining that the number of the spare extents in a source storage device among the plurality of storage devices is lower than a predetermined threshold, select a source extent from a source storage device, wherein the source extent refers to an extent in a created stripe included in the storage system; a determination module configured to, based on a set of extents other than the source extent in the stripe, determine a set of storage device sequences respectively associated with the set of extents, wherein a storage device sequence in the set of storage device sequences is associated with an extent in the set of extents and includes a storage device where the extent is located and a plurality of consecutive storage devices adjacent to the storage device; an identification module configured to identify a destination extent from the plurality of spare extents in the set of storage device sequences; and a migration module configured to migrate data in the source extent to the destination extent. According to an example implementation of the present disclosure, the apparatus further includes modules for performing other steps in the method described above.

Figure 9:
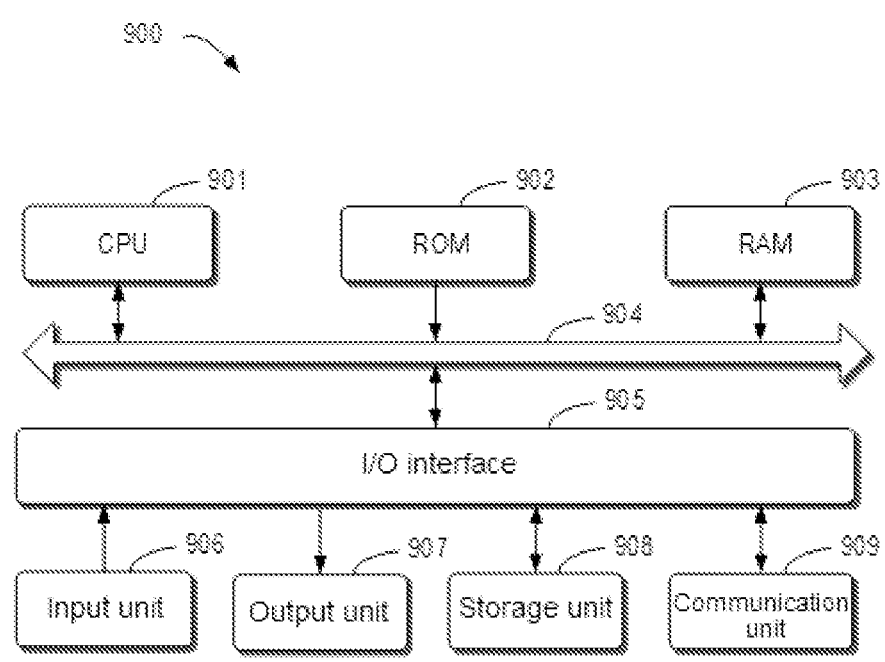
FIG. 9 schematically illustrates a block diagram of a device for managing spare extents based on a dynamic window according to an implementation of the present disclosure.

FIG. 9 schematically illustrates a block diagram of device 900 for managing spare extents based on a dynamic window according to an implementation of the present disclosure. As shown in the figure, device 900 includes central processing unit (CPU) 901 that may perform various appropriate actions and processing according to computer program instructions stored in read-only memory (ROM) 902 or computer program instructions loaded from storage unit 908 into random access memory (RAM) 903. In RAM 903, various programs and data required for the operation of device 900 may also be stored. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices via a computer network such as the Internet and/or various telecommunication networks.

The various processes and processing described above, such as method 300, may be performed by processing unit 901. For example, in some implementations, method 300 may be implemented as a computer software program that is tangibly included in a machine-readable medium, such as storage unit 908. In some implementations, part or all of the computer program may be loaded in and/or installed to device 900 through ROM 902 and/or communication unit 909. When the computer program is loaded into RAM 903 and executed by CPU 901, one or more steps of method 300 described above may be performed. Alternatively, in other implementations, CPU 901 may also be configured in any other suitable manner to implement the above processes/methods.

According to an example implementation of the present disclosure, an electronic device is provided, including: at least one processor; and a memory coupled to the at least one processor. The memory has instructions stored therein. When executed by the at least one processor, the instructions cause the device to perform a method for managing spare extents in a storage system. The storage system includes a plurality of storage devices. The method includes: in response to determining that the number of the spare extents in a source storage device among a plurality of storage devices is lower than a predetermined threshold, selecting a source extent from the source storage device, wherein the source extent refers to an extent in a created stripe included in the storage system; based on a set of extents other than the source extent in the stripe, determining a set of storage device sequences respectively associated with the set of extents, wherein a storage device sequence in the set of storage device sequences is associated with an extent in the set of extents and includes a storage device where the extent is located and a plurality of consecutive storage devices adjacent to the storage device; identifying a destination extent from the plurality of spare extents in the set of storage device sequences; and migrating data in the source extent to the destination extent.

According to an example implementation of the present disclosure, determining a set of storage device sequences includes: for an extent in the set of extents, determining, from the plurality of storage devices, a storage device where the extent is located; and determining the plurality of consecutive storage devices adjacent to the storage device based on a predetermined window size.

According to an example implementation of the present disclosure, determining the plurality of consecutive storage devices includes: selecting the plurality of consecutive storage devices from the plurality of storage devices based on the predetermined window size, so that the storage device is close to the center of the storage device sequence.

According to an example implementation of the present disclosure, determining the destination extent includes: determining an intersection set of the set of storage device sequences, and selecting the destination extent from at least one storage device in the intersection set.

According to an example implementation of the present disclosure, selecting the destination extent from at least one storage device in the intersection set includes: determining, from the at least one storage device, a set of candidate storage devices that do not include any extents in a stripe; selecting a destination storage device from the set of candidate storage devices; and selecting the destination extent from unused spare extents in the destination storage device.

According to an example implementation of the present disclosure, selecting the destination storage device from the set of storage devices includes: respectively determining a set of stripe correlations between the set of candidate storage devices and the stripe; and selecting the destination storage device from the set of candidate storage devices based on the set of stripe correlations.

According to an example implementation of the present disclosure, respectively determining the set of stripe correlation between the set of candidate storage devices and the stripe includes: for a given storage device in the set of candidate storage devices, determining the stripe correlation between the given storage device and the stripe based on a correlation between the given storage device and each storage device in the stripe.

According to an example implementation of the present disclosure, selecting the destination storage device from the set of candidate storage devices based on the set of stripe correlations further includes selecting the destination storage device based on at least one of the following: a device correlation of the destination storage device; and the number of unused spare extents in the destination storage device.

According to an example implementation of the present disclosure, selecting the source extent from the source storage device includes: selecting the source extent based on a workload of each extent in each created stripe in the source storage device.

According to an example implementation of the present disclosure, the method further includes: identifying the source extent as a spare extent; and updating address mapping of the stripe based on an address of the destination extent.

According to an example implementation of the present disclosure, the plurality of storage devices are arranged in a ring manner, the stripe is a stripe in a redundant array of independent disks, and the number of the plurality of storage devices is greater than an upper threshold of the number of storage devices included in groups for forming the redundant array of independent disks, and the predetermined window size is determined based on the upper threshold.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided. The computer-readable medium has machine-executable instructions stored thereon, and when executed by at least one processor, the machine-executable instructions cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Smalltalk and C++, as well as conventional procedural programming languages, such as "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to multiple implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing spare extents in a storage system which comprises a plurality of storage devices, the method comprising:

in response to determining that the number of spare extents in a source storage device of the plurality of storage devices is lower than a predetermined threshold, selecting a source extent from the source storage device, wherein the source extent is an extent in a created stripe included in the storage system;

based on a set of extents other than the source extent in the stripe, determining a set of storage device sequences respectively associated with the set of extents, wherein a storage device sequence in the set of storage device sequences is associated with an extent in the set of extents, and comprises a storage device where the extent is located and a plurality of consecutive storage devices adjacent to the storage device;

identifying a destination extent from a plurality of spare extents in the set of storage device sequences; and migrating data in the source extent to the destination extent.

2. The method according to claim 1, wherein determining the set of storage device sequences comprises: for the extent in the set of extents, determining, from the plurality of storage devices, the storage device where the extent is located; and based on a predetermined window size, determining the plurality of consecutive storage devices adjacent to the storage device.

3. The method according to claim 2, wherein determining the plurality of consecutive storage devices comprises:

based on the predetermined window size, selecting the plurality of consecutive storage devices from the plurality of storage devices, so that the storage device is close to the center of the storage device sequence.

4. The method according to claim 1, wherein selecting the destination extent comprises:

determining an intersection set of the set of storage device sequences; and selecting the destination extent from at least one storage device in the intersection set.

5. The method according to claim 4, wherein selecting the destination extent from the at least one storage device in the intersection set comprises:

determining, from the at least one storage device, a set of candidate storage devices which do not comprise any extents in the stripe; and selecting a destination storage device from the set of candidate storage devices; and selecting the destination extent from unused spare extents in the destination storage device.

6. The method according to claim 5, wherein selecting the destination storage device from the set of candidate storage devices comprises:

respectively determining a set of strip correlations between the set of candidate storage devices and the stripe; and selecting the destination storage device from the set of candidate storage devices based on the set of stripe correlations.

7. The method according to claim 6, wherein respectively determining the set of stripe correlations between the set of candidate storage devices and the stripe comprises: for a given storage device in the set of candidate storage devices, determining the stripe correlation between the given storage device and the stripe based on a correlation between the given storage device and each storage device where a corresponding extent is located in the stripe.

8. The method according to claim 6, wherein selecting the destination storage device from the set of candidate storage devices based on the set of stripe correlations further comprises selecting the destination storage device based on at least one of the following:

a device correlation of the destination storage device; and the number of unused spare extents in the destination storage device.

9. The method according to claim 1, wherein selecting the source extent from the source storage device comprises: selecting the source extent based on workloads of the extents in the created stripes in the source storage device.

10. The method according to claim 1, further comprising: identifying the source extent as a spare extent; and updating address mapping of the stripe based on an address of the destination extent.

11. The method according to claim 1, wherein the plurality of storage devices are arranged in a ring manner, the stripe is a stripe in a redundant array of independent disks, and the number of the plurality of storage devices is greater than an upper threshold of the number of storage devices included in groups for forming the redundant array of independent disks, and the predetermined window size is determined based on the upper threshold.

12. An electronic device, the device comprising:

at least one processor; and a memory coupled to the at least one processor, wherein the memory has instructions stored therein which, when executed by the at least one processor, cause the device to perform a method for managing spare extents in a storage system that comprises a plurality of storage devices, and the method comprises:

in response to determining that the number of spare extents in a source storage device of the plurality of storage devices is lower than a predetermined threshold, selecting a source extent from the source storage device, wherein the source extent is an extent in a created stripe included in the storage system;

based on a set of extents other than the source extent in the stripe, determining a set of storage device sequences respectively associated with the set of extents, wherein a storage device sequence in the set of storage device sequences is associated with an extent in the set of extents, and comprises a storage device where the extent is located and a plurality of consecutive storage devices adjacent to the storage device;

identifying a destination extent from a plurality of spare extents in the set of storage device sequences; and migrating data in the source extent to the destination extent.

13. The device according to claim 12, wherein determining the set of storage device sequences comprises: for the extent in the set of extents, determining, from the plurality of storage devices, the storage device where the extent is located; and based on a predetermined window size, determining the plurality of consecutive storage devices adjacent to the storage device.

14. The device according to claim 13, wherein determining the plurality of consecutive storage device comprises:

based on the predetermined window size, selecting the plurality of consecutive storage devices from the plurality of storage devices, so that the storage device is close to the center of the storage device sequence.

15. The device according to claim 12, wherein selecting the destination extent comprises:

determining an intersection set of the set of storage device sequences; and selecting the destination extent from at least one storage device in the intersection set.

16. The device according to claim 15, wherein selecting the destination extent from the at least one storage device in the intersection set comprises:

determining, from the at least one storage device, a set of candidate storage devices which do not comprise any extents in the stripe; and selecting a destination storage device from the set of candidate storage devices; and selecting the destination extent from unused spare extents in the destination storage device.

17. The device according to claim 16, wherein selecting the destination storage device from the set of candidate storage devices comprises:
respectively determining a set of strip correlations between the set of candidate storage devices and the stripe; and
selecting the destination storage device from the set of candidate storage devices based on the set of stripe correlations.

18. The device according to claim 17, wherein selecting the destination storage device from the set of candidate storage devices based on the set of stripe correlations further comprises selecting the destination storage device based on at least one of the following:
a device correlation of the destination storage device; and
the number of unused spare extents in the destination storage device.

19. The device according to claim 12, wherein the method further comprises:
identifying the source extent as a spare extent; and
updating address mapping of the stripe based on an address of the destination extent.

20. A computer program product having a non-transitory computer readable medium which stores a set of instructions to manage spare extents in a storage system which comprises a plurality of storage devices; the set of instructions, when carried out by computerized circuitry, causing the computerized circuitry to perform a method of:
in response to determining that the number of spare extents in a source storage device of the plurality of storage devices is lower than a predetermined threshold, selecting a source extent from the source storage device, wherein the source extent is an extent in a created stripe included in the storage system;
based on a set of extents other than the source extent in the stripe, determining a set of storage device sequences respectively associated with the set of extents, wherein a storage device sequence in the set of storage device sequences is associated with an extent in the set of extents, and comprises a storage device where the extent is located and a plurality of consecutive storage devices adjacent to the storage device;
identifying a destination extent from a plurality of spare extents in the set of storage device sequences; and
migrating data in the source extent to the destination extent.

* * * * *